United States Patent [19]
Sandt

[11] Patent Number: 5,576,081
[45] Date of Patent: Nov. 19, 1996

[54] COMPOSITE STRUCTURAL ELEMENT AND PROCESS FOR MAKING SAME

[76] Inventor: Hartley Sandt, 2425 Dogwood La., Orange Park, Fla. 32073

[21] Appl. No.: 565,130

[22] Filed: Nov. 30, 1995

Related U.S. Application Data

[63] Continuation of Ser. No. 119,064, filed as PCT/US91/01636 Mar. 13, 1991, abandoned, which is a continuation-in-part of Ser. No. 138,151, Dec. 28, 1987, Pat. No. 5,004,574.

[51] Int. Cl.$^6$ ............................................. B27D 22/00
[52] U.S. Cl. ................ 428/36.9; 428/34.5; 428/34.7; 428/35.6; 428/35.7; 428/36.3; 428/373; 428/375; 428/369; 428/371; 428/377; 428/378; 428/398; 264/101; 264/257; 264/258; 264/262; 264/275; 264/277; 264/279.1; 264/295; 264/296; 264/339; 267/166
[58] Field of Search ........................... 428/373, 374, 428/378, 372, 370, 34.5, 35.2, 36.9, 36.91, 36.4, 36.3, 375, 398; 267/166; 264/257, 258, 1.5, 45.8, 36, 339, 101, 277, 275, 279.1, 295, 296, 262

[56] References Cited

U.S. PATENT DOCUMENTS

| | | | |
|---|---|---|---|
| 2,818,606 | 1/1958 | White | 18/55 |
| 4,312,917 | 1/1982 | Hawley | 428/375 |
| 4,409,154 | 10/1983 | Grenat | 264/1.5 |
| 4,456,401 | 6/1984 | Williams | 156/294 |
| 4,548,664 | 10/1985 | Canivet | 156/166 |
| 4,564,487 | 1/1986 | Bennett | 264/40.7 |
| 4,643,929 | 2/1987 | Watanabe et al. | 428/36 |
| 4,661,387 | 4/1987 | Watanabe et al. | 428/375 |
| 4,676,942 | 6/1987 | Ollivier | 265/257 |
| 4,741,684 | 5/1988 | Cornelison et al. | 156/433 |
| 4,769,286 | 9/1988 | Le Noane | 428/372 |
| 4,773,450 | 9/1988 | Stanley | 156/78 |
| 5,004,574 | 4/1991 | Sandt | 264/101 |
| 5,405,668 | 4/1995 | Sandt | 428/36.9 |

*Primary Examiner*—Patrick Ryan
*Assistant Examiner*—J. M. Gray
*Attorney, Agent, or Firm*—Arthur G. Yeager

[57] ABSTRACT

An elongated structural element includes an external tubular casing (11) with the hollow interior space filled with a polymer binder (12) containing a plurality of elongated parallel continuous strands of fiber reinforcement material (13) extending lengthwise of the element. A method for preparing such an element is provided by filling a preformed tubular casing (11) with a polymer binder (12) in liquid form in which is dispersed the fiber reinforcement material (13) and allowing the polymer binder to solidify. The element may be initially shaped prior to solidification or reheated into another shape such as a helical coil or spring. An internal casing (29) can also be used where the fiber reinforcement strands (13) are between the external and internal casings (11) and (29).

16 Claims, 3 Drawing Sheets

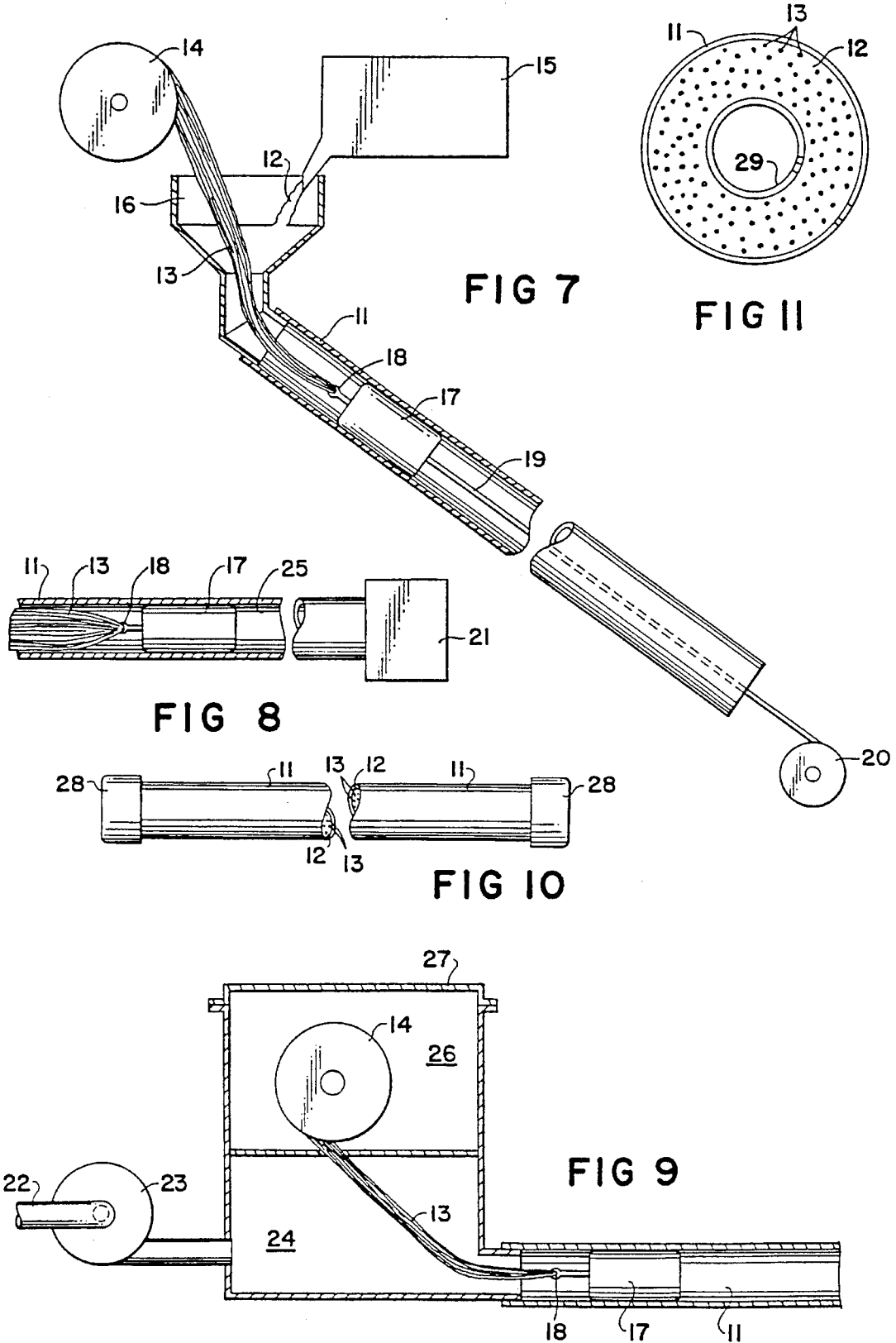

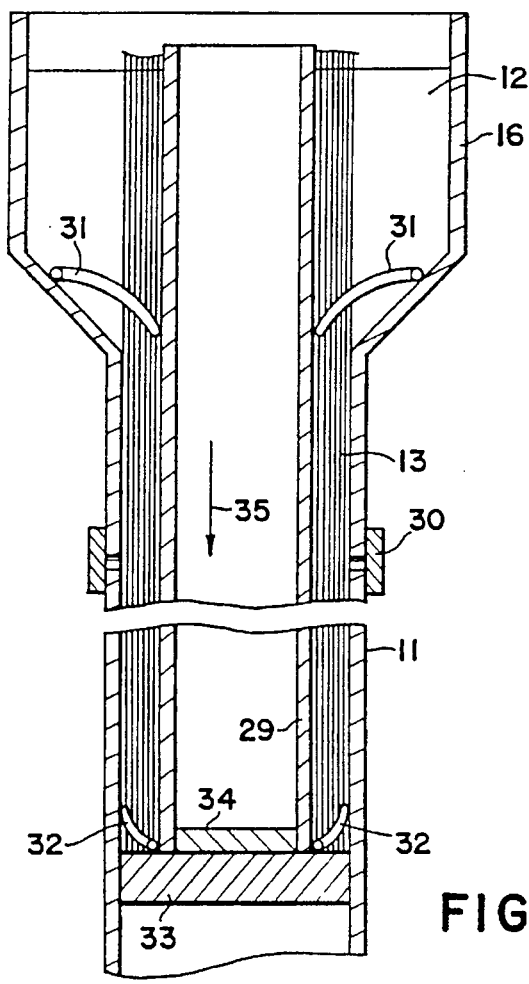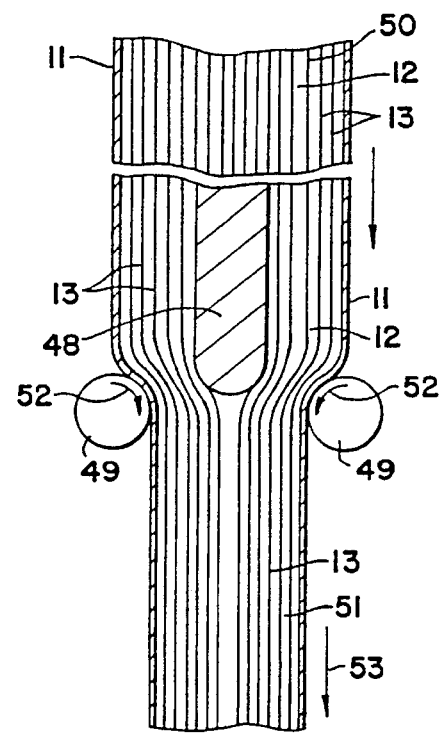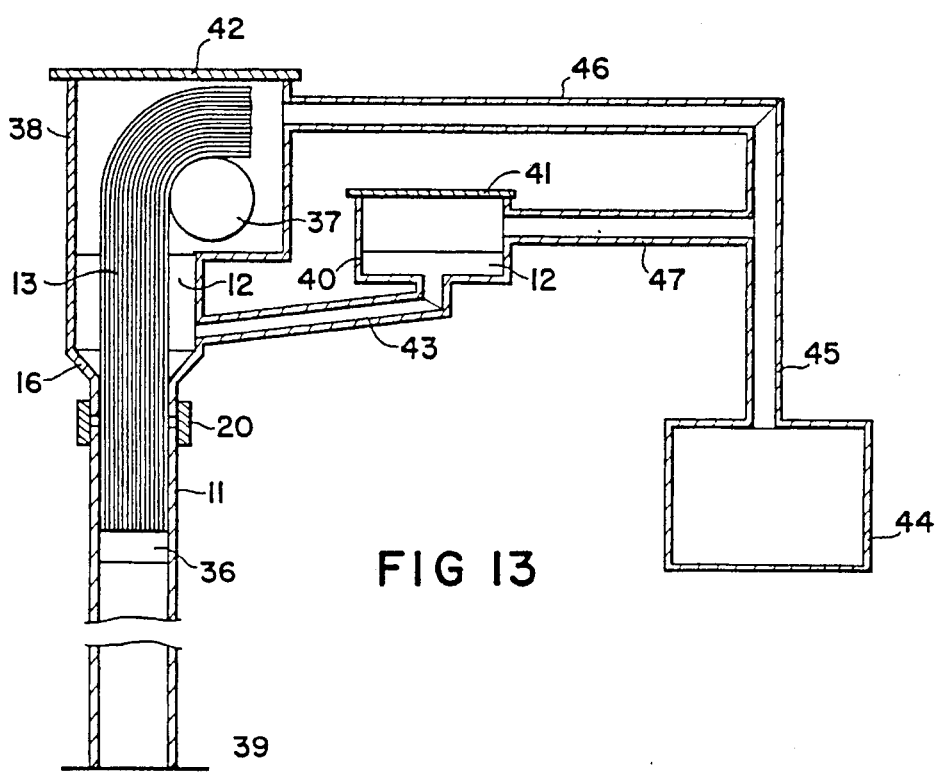

COMPOSITE STRUCTURAL ELEMENT AND PROCESS FOR MAKING SAME

This application is a continuation of application Ser. No. 08/119,064 filed on Sep. 13, 1993, now abandoned, which is a 371 of PCT/US91/01636 Mar. 13, 1991 which is a CIP of 07/138,151 Dec. 28, 1987—U.S. Pat. No. 5,004,574.

BACKGROUND OF THE INVENTION

Structural elements such as rods, tubes, and beams are normally made by casting, extruding, or rolling techniques to produce plastic or metal tubing, sheets, rods, beams, and the like. These structural elements normally comprise a single material which is chosen for its combination of physical properties, e.g., strength and weight, as well as corrosion resistance, color, and texture. Plastic molding and extrusion procedures have provided the possibility of preparing plastic structural elements with selected combinations of physical properties, chemical properties, color, texture, etc. Fiber reinforcement of plastic materials has provided much higher physical strength properties than the plastic material alone could offer. In general, these fiber reinforced materials are made by extruding through a die a plastic melt having continuous strnads of fiber distributed therein. The extrudate is then solidified in the form of a continuous rod, beam, or strand and can be cut into whatever length is desired for use. The disadvantages of the prior art procedures are (1) that the extrudate can not be made into a curved or non-linear article, and (2) the surface properties at the extrudate cannot be changed from that inherent in the extruded plastic.

It is an object of this invention to provide a novel structural element of fiber reinforced plastic material. It is another object of this invention to provide processes for manufacturing such structural elements. Still other objects will be apparent from the more detailed description which follows.

BRIEF SUMMARY OF THE INVENTION

This invention relates to an elongated solid or tubular structural element having a substantially identical cross section over its entire length, the element having a solic core of thermoplastic or thermosetting resin material embedded in which is a plurality of elongated continuous strands of lengthwise fiber reinforcement material, preferably in substantially parallel array, and a continuous casing around the core.

This invention also relates to a process for preparing an elongated structural element comprising:

(1) preparing a hollow tubular solid casing being an integral part of the structural element;

(2) filling the interior of the casing with a polymer material in liquid form; and distributing throughout said polymer material a plurality of elongated continuous strands of fiber reinforcement material substantially parallel to each other and extending lengthwise of the casing; and (3) allowing the polymer material to solidify with the strands of fiber reinforcement material embedded therein.

The process and element may include a tubular shape employing an external casing and an internal casing with the space therebetween being filled with the polymer material and fiber reinforcement materials. The element may also be shaped before solidification, or thereafter by reheating, into a helical coil or spring, or other shape like an I-beam or an H-beam or any irregular shape. Sometimes this requires the displacement and/or removal of some of the plastic material.

BRIEF DESCRIPTION OF THE DRAWINGS

The invention as to its organization and method of operation, together with further objects and advantages thereof, is best understood by reference to the following description taken in connection with the accompanying drawings in which:

FIG. 7 is an illustration of one embodiment of the process of this invention;

FIG. 8 is an illustration of a second embodiment of the process of this invention;

FIG. 9 is an illustration of a third embodiment of the process of this invention;

FIG. 10 is an illustration of the structural element of this invention with end caps attached;

FIG. 11 is an end elevational view of a hollow structural element of this invention;

FIG. 12 is an illustration of a fourth embodiment of this invention;

FIG. 13 is an illustration of a fifth embodiment of this invention; and

FIG. 14 is an illustration of a process for changing a structural element having a round cross section to one having a non-round cross section.

DETAILED DESCRIPTION OF THE INVENTION

This invention relates to articles of manufacture which are shown in FIGS. 1–6, 10, and 11 of the attached drawings, and to processes for preparing such articles which are shown in FIGS. 7–9, and 12–14.

Figure 1:
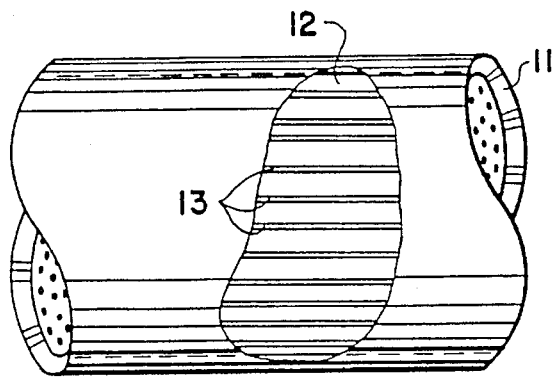
FIG. 1 is a side elevational view of one embodiment of the structural element of this invention.
Figure 2:
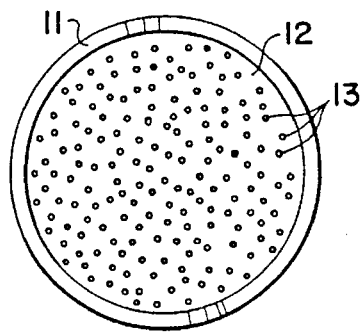
FIG. 2 is an end elevational view of the structural element shown in FIG. 1.

In FIGS. 1–6, 10 and 11 there are depicted several types of structural elements according to this invention. In FIGS. 1–2 there is shown a cylindrical rod element having three components; namely, an external casing 11, an internal binder 12, and strands 13 of fiber reinforcement material. These are all joined together into a single unitary structure which has an indefinite length and a substantially similar cross section at any place along that length.

External casing 11 is a flexible, semiflexible, or rigid pipe or tubing having whatever properties are important for the eventual use of the structural element. If corrosion resistance, abrasion resistance, or weather resistance is important, casing 11 must provide that property; and so on for other property requirements. Generally, casing 11 should be a flexible or semiflexible thermoplastic material which is compatible with binder 12 and does not react chemically therewith. In other embodiments casing 11 may be a metallic tube, an animal or human vein, intestine, or the like. Preferably there is no bond between the two, although in certain embodiments binder 12 and casing 11 may be bonded to each other. Typical materials for casing 11 include polyolefins, polyvinyls, polyesters, polyacetals, polyacrylics, polyamides, polyfluorocarbons, polycarbonates, and other plastics of similar properties, aluminum, human or animal tissue, and the like.

The internal space in casing 11 is filled with binder 12 and fiber reinforcement 13. Binder 12 must be capable of tightly adhering to strands 13. Preferably, binder 12 should be available in liquid form for ease in manufacturing the structural element of this invention, and capable of being transformed into solid form at ambient conditions for use as binder 12 in the structural element in ordinary use. Binder 12 may be a thermoplastic or a thermosetting material each of which exists in both liquid and solid forms. The thermoplastic materials normally change from liquid to solid and from solid to liquid by temperature changes. Thermosetting materials normally involve two or more starting components which are mixed together to produce a liquid which is hardened by chemical reaction between the components and cannot later be liquefied. Typical thermoplastics include polyolefins, polyesters, polyvinyls, polyacetals, polyacrylics, polyamides, polyfluorocarbons, polycarbonates, and the like. Typical thermosetting binders include phenol-formaldehyde resins, melamine resins, epoxy resins, urea-formaldehyde resins, polyesters, and the like.

The fiber reinforcement material 13 is a plurality of strands of fiber or filament that are distributed throughout the binder and are in substantially parallel arrangement running lengthwise of the structural element. The strands may be in a linear arrangement or in a sinuous or helical arrangement preferably mutually parallel to each other, although there may be embodiments where strands 13 are in any desired nonparallel arrangement. Ideally, the strands 13 would be separated from each other and equally distributed throughout all of the binder 12. From a practical point of view this may not be achieved, but preferably, the strands are extended lengthwise throughout the structural element and distributed as evenly as possible in the binder. Each strand 13 may be a single filament or a plurality of filaments twisted together, or may be a single fiber or a plurality of fibers twisted into a thread; or may be any other combination of fibers, filaments, threads, yarns or the like that are relatively small in diameter and relatively long and continuous in length. Tubular filaments, threads, yarns and the like are also useful as strands 13. The word "strand" herein is meant to be generic and to include all of the above configurations. The material of the strands may be organic or inorganic. The organic strands include materials such as cotton, wool, bagassee, hemp, polyamide, polyacrylonitrile, polyester, rayon and the like. Inorganic strands include materials such as glass, steel, copper, aluminum, titanium, graphite, and the like.

In order to assure good adhesion between the binder 12 and the strands 13, certain promoters or agents may be employed to enhance the bonds between binder 12 and strands 13.

Figure 3:
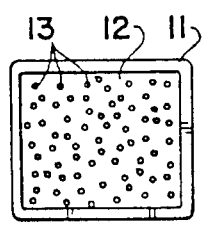
FIG. 3 is an end elevational view of a second embodiment of the structural element of this invention.
Figure 4:
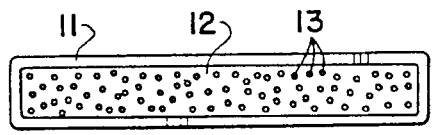
FIG. 4 is an end elevational view of a third embodiment of the structural element of this invention.
Figure 5:
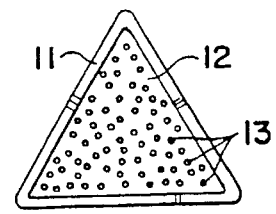
FIG. 5 is an end elevational view of a fourth embodiment of the structural element of this invention.

In FIGS. 3–5 there are shown other structural elements of other cross sectional shapes, e.g., square (FIG. 3), oblong (FIG. 4), and triangular (FIG. 5), which may be solid as shown or tubular with an internal open space, as shown in FIG. 11. Any of these shapes may be prepared in finite lengths and end-capped, as shown in FIG. 10, if it is desirable to protect the open ends from the surrounding medium in which the structural element is used. Still other shapes are within the scope of this invention since any geometric design like an H-beam, an I-beam or star shaped cross section is acceptable.

Figure 6:
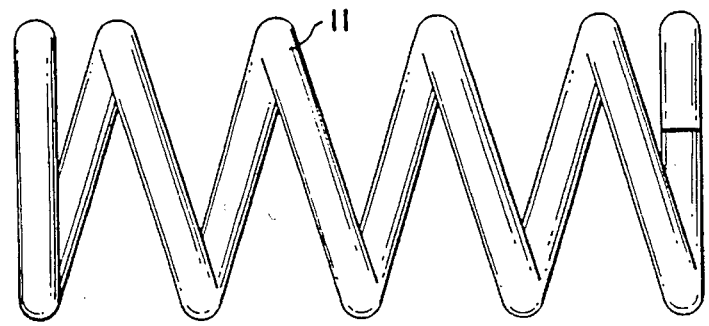
FIG. 6 is an illustration of one type of article, e.g., a coil spring, that can be made from the structural element of this invention.

The structural element of this invention can be sawed, drilled, tapped, twisted, bent, and otherwise used to form useful articles of manufacture. For example, the element may be coiled into a helix to form a coil spring as shown in FIG. 6. If the structural element is made with a thermoplastic binder 12, a preformed straight length of element may be heated, and formed into another shape, e.g., coiled to form the spring of FIG. 6, and cooled to solidify the binder 12, and thereby produce a stable shape. Alternatively, the element may employ a thermoplastic molten binder 12 in casing 11, and the element may be coiled into a spring or formed into another shape before the binder 12 is allowed to solidify. If the binder 12 is a thermosetting material, it must be formed into the final desired shape, e.g., coiled into the spring of FIG. 6, before binder 12 has had time to set to a solid. There are a multitude of applications for the structural element of this invention including ropes, rods, structural beams for chemical processing equipment, articles used under sea water, strands or bones used in human surgical procedures, and the like.

In the process of this invention as shown in FIGS. 7–9 and 12–14 a plug 17 is moved through the internal hollow of casing 11 with binder 12 and fiber reinforcement strands 13 filling the hollow behind the plug 17 as it moves along. In the process depicted in FIG. 7, a length of casing 11 is fitted with a feed funnel 16 into which is fed a continuous length of a plurality of strands 13 and at the same time is fed liquid or molten binder 12 from a supply reservoir 15. Plug 17 is slidable within casing 11 and has an eye 18 to which the hank of strands 13 is attached. A pull cable 19 is attached to the front of plug 17 to pull plug 17 through casing 11 by windup drum 20. As plug 17 is moved downward toward drum 20, binder 12 fills the interior hollow of casing 11 and the individual strands in the hank disperse themselves throughout the entire cross section of the interior hollow of casing 11 to eventually approach the distribution shown in FIGS. 2–5. It can be appreciated that casing 11 and plug 17 may take any shape, such as those in FIGS. 2–5. Furthermore, hollow shapes as shown in FIG. 11 may be made by making plug 17 into an annular object and sliding between an inner casing 29 and an outer casing 11 (see FIG. 11). If preferred, inner casing 29 may be supported by an internal mandrel (not shown) to support inner casing against collapse until binder 12 hardens.

In FIG. 8 the same general arrangement as that of FIG. 7 is shown except that instead of a windup drum 20 and a cable 19 to move plug 17 there is a vacuum pump 21 to produce a lower pressure in the space 25 ahead of plug 17 causing plug 17 to move toward vacuum pump 21.

In FIG. 9 there also is the same general arrangement of casing 11, plug 17 and strands 13, attached to eye 18. In this instance the force to move plug 17 through casing 11 is provided by the pressure on binder 12. Inlet pipe 22 feeds liquid binder 12 to pump 23 which pumps binder into pressure vessel 27 which has an outlet into casing 11. Roll 14 of fiber reinforcement strands 13 is mounted inside vessel 27 in a pressurized space 26 designed to offset the pressure on binder 12 emitted from pump 23. Binder 13 is supplied to space 24 under pressure and this bears against plug 17 causing it to move to the right and fill up casing 11.

In all of the embodiments of FIGS. 7, 8, and 9 the strands will be substantially linear and parallel to each other and to the longitudinal axis of casing 11 if plug 17 is simply pulled through casing 11. If plug 11 is rotated about its axis of travel as it is pulled through casing 11, strands 13 can be made into a sinuous or helical orientation while the individual strands 13 remain generally parallel with each other.

It is contemplated that in certain corrosive conditions there may be a need to completely insulate binder 12 and strands 13 from the surrounding corrosive medium. In such instances there may be end caps 28 sealed onto any cut ends of the structural element so as to leave only the material of the casing exposed as shown in FIG. 10. End cap 28 can be heat sealed or otherwise attached to casing 11 so as to be leak proof and therefore completely corrosion-resistant.

It is an important feature of this invention to provide elements in which the fiber reinforcing component is a continuous strand and not a plurality of chopped fibers. The continuous strands employed in this invention provide a greatly improved modulus of elasticity as compared to that of the strand containing short lengths of reinforcing fibers or filaments. It is for this reason that an excellent coil spring can be made from the structural element of this invention, while such a coil spring from the prior art would not be operable.

FIGS. 12–14 show alternate embodiments of the process of making the structural elements of FIGS. 2–5 and 11. In FIG. 12 there is illustrated a procedure to make hollow tubular structural elements as shown in FIG. 11. Outer casing 11 is attached to funnel 16 by clamp 30. Inner casing 29 with a plug at its lower or forward end is introduced into funnel 16 along with plug 33 into which the forward ends of fiber strands 13 have been embedded by previously molding plug 33 with strands 13 embedded therein. Plug 33, inner casing 29, and plug 34 are moved downwardly in the direction of arrow 35 while outer casing 11 and funnel 16 remain stationary and filled with liquid binder 12. As inner casing 29, plug 34, plug 33 and strands 13 move downwardly the annular space between casings 11 and 29 fills with binder 12 and fiber strands 13 are dispersed throughout. Plug 34 is needed to prevent binder 12 from leaking into the interior hollow of internal casing 29. Plug 34 may be independent of plug 33 or attached thereto in different embodiments of this process. Centering guides 31 and 32 keep inner casing 29 centered in casing 11 as casing 29 advances. Guides 31 and 32 are spider legs. Guide 31 is attached to funnel 16 with its distal ends rubbing against inner casing 29 as it moves forward. Guides 32 are attached to casing 29 or its plug 34 with its distal ends rubbing against outer casing 11 as inner casing 29 moves forward. Preferably, guides 31 and 32 are spring biased to bear against casings 29 and 11, respectively. Furthermore, guides 31 preferably are pivotable so as to be no obstacle to the initial entrance of plug 33 into and through funnel 16 to the top of outer casing 11. When the desired length of tubular structural element 11 has been made, the process can be repeated by starting again with a new length of outer casing 11.

In FIG. 13 there is shown an alternative to the process of FIG. 9 for making the structural element by fluid pressure causing the movement of the plug to which fiber strands 13 are attached. A plurality of fiber strands 13 are introduced over a feed roller 37 in header box 38 and downward through funnel 16 into outer casing 11 which is temporarily attached to funnel 16 by clamp 20. The forward ends of strands 13 are embedded in plug 36. Casing 11 rests on a base plate 39 which will serve as a stop to plug 36 which moves downward in the process. Binder 12 is kept in container 40 which is connected by passageway 43 to funnel feeder 16 permitting the level of binder 12 to be the same in funnel 16 and in container 40. Air pressure is maintained in tank 44 which is connected by lines 45, 46 and 47 to both of header box 38 and binder container 40 to equalize the pressure on both surfaces of liquid binder 12. The pressure is transmitted to plug 36 causing it to move forward in casing 11 until it reaches base plate 39. Lid 41 is provided for adding binder 12 to container 40, and lid 42 is provided for replacing a supply of strands 13 over roller 37 in head box 38.

In FIG. 14 there is shown a procedure for transforming an element of circular cross section, as in FIG. 2, to an element of noncircular cross section, as in FIGS. 3–5, when outer casing 11 is flexible and capable of being bent and formed into different shapes. The problem in such modifications is that the cross sectional area and circumference of the beginning element, e.g., circular, may not be the same as those of the final element, e.g., a rectangle. The limiting factor normally is that the circumference or perimeter of the beginning element and final element must be the same if the outer casing 11 is to remain smooth, continuous, and unwrinkled. Generally this is accomplished by fixing the perimeter dimensions of the desired final element and adjusting the process of making the beginning element to fit those dimensions. It is basic geometry that for any given cross sectional area, a circle will have the smallest perimeter length of any shape that encloses that area. Accordingly, as an example, if the final element is to be a rectangular beam having dimensions of one inch by two inches, a perimeter length of six inches and a cross sectional area of two square inches; a circle of the same perimeter length of six inches will have a diameter of 1.91 inches and a cross sectional area of 2.865 square inches. Therefore, an element of circular cross section (2.865 square inches) must be squeezed to a cross sectional area of 2.0 square inches to be reshaped into a rectangular cross section of one inch by two inches. Referring to FIG. 14, the above means that a circular cross section element 50 with a cross sectional area of 2.865 square inches and with binder 12 in a liquid form is squeezed by rollers 49 turning in the direction of arrows 52 as the element moves past an internal solid of about 0.865 square inch cross section to reduce the cross sectional area to 2.0 square inches.

Rollers 49 with or without the assistance of other forming devices can then shape element 51 into a rectangular cross section of one inch by two inches before binder 12 solidifies. It may be seen that this procedure may be applied to the end of the procedures of FIGS. 7–9 and 13 or before binder 12 solidifies, or alternatively, a rigid element may be heated to liquefy binder 12 (if it is thermoplastic) and then subjected to the reshaping procedure of FIG. 14. While the beginning element may have any shape, it preferably is circular because it is easier to make and it automatically provides a better dispersion of strands 13 than any other shape.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

I claim:

1. A process for preparing a non-extruded elongated structural element characterized by the steps of:

(A) preparing a hollow external solid walled casing of a tubular material being an integral part of the structural element;

(B) preparing a hollow internal solid walled casing of a tubular material being an integral part of the structural element;

(C) positioning the internal casing generally concentrically within the external casing to provide a space therebetween;

(D) filling the space between said external and internal casings with a polymer binder material in liquid form and simultaneously distributing generally uniformly throughout the polymer binder material, a plurality of individual elongated continuous strands of fiber reinforcement material extending substantially parallel and lengthwise of the external and internal casing thereby forming a hollow elongated structural element;

(E) solidifying the polymer binder material with the strands of fiber reinforcement material embedded therein; and wherein step (D) includes the step of:

(F) positioning a plug on the end of the internal casing, which extends outwardly to abut the inside of the external casing; and (G) moving the plug and internal casing through the length of the external casing to cause polymer binder material, and fiber reinforcement material to be fed into the space between the casings behind the moving plug.

2. The process of claim 1 further characterized by the step of:

(H) connecting a hank of the fiber reinforcement material to the plug so that the fiber reinforcement material is pulled behind the plug as the plug moves.

3. The process of claim 1 further characterized by the step of:

(I) pressurizing the polymer binder material between the casings behind the plug for moving the plug through the casings.

4. The process of claim 1 wherein step (E) is accomplished while maintaining the casings containing the polymer material and the fiber reinforcement in the shape of a helical coil.

5. The process of claim 1 further characterized by the steps of:

(I) reheating the solidified structural element;

(J) forming it into a desired shape; and (K) allowing the polymer binder material to resolidify with the element in the desired shape.

6. A process for preparing a non-extruded elongated structural element characterized by the steps of:

(A) preparing a hollow external solid walled casing of a tubular material being an integral part of the structural element;

(B) preparing a hollow internal solid walled casing of a tubular material being an integral part of the structural element;

(C) positioning the internal casing generally concentrically within the external casing to provide a space therebetween;

(D) filling the space between said external and internal casings with a polymer binder material in liquid form and simultaneously distributing generally uniformly throughout the polymer binder material a plurality of individual elongated continuous strands of fiber reinforcement material extending substantially parallel and lengthwise of the external and internal casings thereby forming a hollow elongated structural element;

(E) passing the casings while the polymer binder material is liquid through a shape forming means to cause the outer casing to have a noncircular cross sectional shape; and (F) solidifying the polymer binder material with the strands of fiber reinforcement material embedded therein.

7. The process of claim 6 wherein said step (D) includes the step of:

(G) moving a plug in the space between the external and internal casings through the length of the casings to cause the polymer binder material and the fiber reinforcement material to be fed into the space between the casings behind the moving plug.

8. The process of claim 6 wherein step (D) includes the step of:

(G) positioning a plug on the end of the internal casing, which extends outwardly to abut the inside of the external casing; and (H) moving the plug and internal casing through the length of the external casing to cause polymer binder material, and fiber reinforcement material to be fed into the space between said casings behind the moving plug.

9. The process of claim 6 further characterized by the step of:

(G) connecting a hank of the fiber reinforcement material to the plug so that the fiber reinforcement material is pulled behind the plug as the plug moves.

10. The process of claim 6 further characterized by the step of:

(H) pressurizing the polymer binder material between the casings behind the plug for moving the plug through the casings.

11. The process of claim 6 wherein step (E) is accomplished while maintaining the casings containing the polymer material and the fiber reinforcement in the shape of a helical coil.

12. The process of claim 6 further characterized by the steps of:

(I) reheating the solidified structural element;

(J) forming it into a desired shape; and (K) allowing the polymer binder material to resolidify with the element in the desired shape.

13. A non-extruded rigid elongated, and solid composite structural element comprising an elongated solid member, said member having a solid rigid core of solidified polymer material, a plurality of elongated substantially continuous and individual strands of fiber reinforcement material extending lengthwise of and embedded in and substantially uniformly throughout and filling said core, a continuous elongated solid walled rigid casing around said core of polymer material, said solid core having an elongated hollow extending generally centrally thereof and generally parallel to said elongated casing, and an elongated internal solid walled rigid casing extending substantially throughout said elongated hollow with said core being contained between said casings, said outer casing prior to solidification of said core being formed into shape different from the shape of said inner casing.

14. The element of claim 13 further comprising cap means on respective ends of said element for sealing said core within and between said casings and said cap means.

15. The element of claim 13 wherein said core is maintained in an unbonded condition with respect to said casings.

16. The element of claim 13 wherein said external casing is non-circular and said internal casing is circular.

* * * * *